(12) United States Patent
Han et al.

(10) Patent No.: US 9,516,659 B2
(45) Date of Patent: Dec. 6, 2016

(54) CARRIER TYPE (NCT) INFORMATION EMBEDDED IN SYNCHRONIZATION SIGNAL

(71) Applicant: Intel Corporation, Santa Clara, CA (US)

(72) Inventors: Seunghee Han, Kyoungkido (KR); Alexei V. Davydov, Novgorod (RU); Hong He, Beijing (CN); Xiaogang Chen, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/128,343

(22) PCT Filed: Sep. 4, 2013

(86) PCT No.: PCT/US2013/058028
§ 371 (c)(1),
(2) Date: Dec. 23, 2013

(87) PCT Pub. No.: WO2014/088659
PCT Pub. Date: Jun. 12, 2014

(65) Prior Publication Data
US 2014/0254567 A1    Sep. 11, 2014

Related U.S. Application Data

(60) Provisional application No. 61/734,323, filed on Dec. 6, 2012.

(51) Int. Cl.
*H04J 3/00* (2006.01)
*H04W 72/08* (2009.01)
(Continued)

(52) U.S. Cl.
CPC .......... *H04W 72/085* (2013.01); *H04B 3/232* (2013.01); *H04B 7/015* (2013.01); *H04L 5/0048* (2013.01);
(Continued)

(58) Field of Classification Search
CPC .... H04W 56/00; H04W 48/08; H04B 7/015; H04L 5/14; H04L 67/1068
USPC ................................. 370/329, 330, 336, 335
See application file for complete search history.

(56) References Cited

U.S. PATENT DOCUMENTS 8,599,828 B2 * 12/2013 Fine .................... H04J 11/0076
370/350
2011/0255485 A1   10/2011 Chen et al.
(Continued)

FOREIGN PATENT DOCUMENTS

| CN | 10475618 A | 7/2015 |
| WO | 2011/035420 A1 | 3/2011 |
| WO | 2014/088659 A1 | 6/2014 |

OTHER PUBLICATIONS

U.S. Appl. No. 61/662,369, filed Jun. 21, 2012.*
(Continued)

*Primary Examiner* — Chuong T Ho
(74) *Attorney, Agent, or Firm* — Alpine Technology Law Group LLC

(57) ABSTRACT

A Second Synchronous Signal (SSS) for a 3GPP LTE downlink signal is generated in such a way that a legacy User Equipment (UE) can determine whether the downlink signal comprises a legacy downlink signal or a New Carrier Type (NCT) downlink signal, which is unavailable to a legacy UE. One exemplary embodiment provides that a first binary sequence and a second binary sequence are generated in which the first and second binary sequences are part of the SSS for the downlink signal. The first binary sequence is multiplied by a first scrambling sequence, and the second binary sequence by a second scrambling sequence in which the first and second scrambling sequences are selected to indicate that the downlink signal is a new carrier type downlink signal. Other exemplary embodiments provide that an order of the first and second scrambling sequences indicates whether the downlink signal is a NCT downlink signal.

19 Claims, 10 Drawing Sheets

(51) Int. Cl.

| | |
|---|---|
| *H04W 56/00* | (2009.01) |
| *H04W 48/08* | (2009.01) |
| *H04L 29/08* | (2006.01) |
| *H04B 7/015* | (2006.01) |
| *H04L 5/14* | (2006.01) |
| *H04L 5/00* | (2006.01) |
| *H04W 72/04* | (2009.01) |
| *H04W 76/02* | (2009.01) |
| *H04W 76/04* | (2009.01) |
| *H04W 8/00* | (2009.01) |
| *H04B 3/23* | (2006.01) |
| *H04L 25/00* | (2006.01) |

(52) U.S. Cl.
CPC ............... *H04L 5/14* (2013.01); *H04L 25/00* (2013.01); *H04L 67/1068* (2013.01); *H04W 8/005* (2013.01); *H04W 48/08* (2013.01); *H04W 56/00* (2013.01); *H04W 72/0413* (2013.01); *H04W 72/082* (2013.01); *H04W 76/023* (2013.01); *H04W 76/046* (2013.01)

(56) References Cited

U.S. PATENT DOCUMENTS

| | | |
|---|---|---|
| 2011/0317780 A1 | 12/2011 | Kang et al. |
| 2012/0039256 A1* | 2/2012 | Kwon .................. H04W 48/12 370/328 |
| 2012/0140862 A1* | 6/2012 | Fine .................... H04J 11/0076 375/362 |
| 2013/0329661 A1* | 12/2013 | Chen ................. H04W 72/0453 370/329 |
| 2013/0343300 A1* | 12/2013 | Kim .................... H04W 72/048 370/329 |
| 2014/0112243 A1* | 4/2014 | Suzuki .................. H04W 56/00 370/328 |
| 2015/0358845 A1* | 12/2015 | Chapman .............. H04W 24/08 455/67.11 |
| 2016/0080121 A1* | 3/2016 | Kim ........................ H04L 5/005 370/329 |

OTHER PUBLICATIONS

U.S. Appl. No. 61/684,151, filed Aug. 17, 2012.*
U.S. Appl. No. 61/658,809, filed Jun. 12, 2012.*
HTC, "Synchronization Signals and Procedure for Unsynchronised New Carriers", R1-121407, 3GPP TSG RAN WG1 Meeting #68bis, Jeju; Korea, Mar. 26-30, 2012, pp. 1-3.
New Postcom, "Discussion on design of PSS and SSS for NCT", R1-124804, 3GPP TSG RAN WG1 Meeting #71, New Orleans, USA, Nov. 12-16, 2012, pp. 1-3.
International Search Report and Written Opinion Received for PCT Patent Application No. PCT/US2013/058028, mailed on Dec. 16, 2013, 13 Pages.
International Preliminary Report on Patentability received for PCT Application No. PCT/US2012/058028, mailed on Jun. 9, 2015.

\* cited by examiner

CARRIER TYPE (NCT) INFORMATION EMBEDDED IN SYNCHRONIZATION SIGNAL

CROSS-REFERENCE TO RELATED APPLICATION

The present patent application claims the benefit of U.S. Provisional Patent Application Ser. No. 61/734,323, filed Dec. 6, 2012, which is incorporated by reference herein.

TECHNICAL FIELD

Embodiments described herein are generally directed to the field of wireless communications.

BACKGROUND

Downlink (DL) throughput for a $3^{rd}$ Generation Partnership Project (3GPP) Long Term Evolution (LTE) communication system can be increased by a New Carrier Type (NCT) downlink signal, for instance, for Band 29, which is a special band that only has a downlink component and no uplink component. One approach being considered for the NCT is to remove or reduce (degenerate) the legacy Physical Downlink Control Channel (PDCCH) or the legacy Cell Specific Reference Signal (CRS) in both the frequency domain and the time domain in the downlink signal. Such an approach, however, is not expected to be backward compatible with legacy wireless terminal devices, such as legacy User Equipment (UE) or mobile station (MS). Moreover, if a legacy UE cannot distinguish a legacy downlink signal from a NCT downlink signal, the legacy UE runs the risk of adversely consuming excess processing power and battery power by attempting to connect to the NCT signal that is unavailable to the UE.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
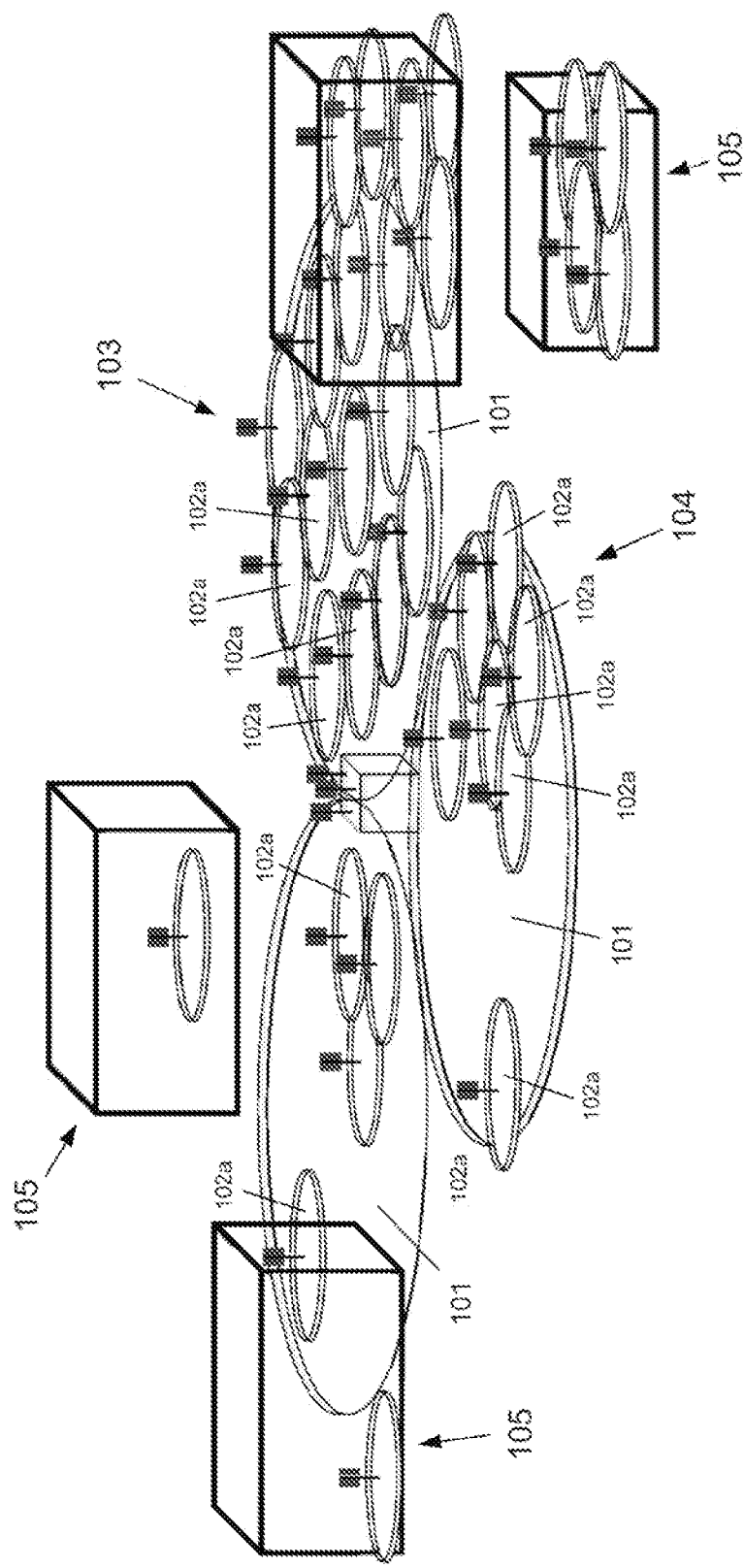
FIG. 1 depicts an exemplary embodiment of a 3GPP LTE communication system comprising a plurality of Master eNBs (MeNBs) and Secondary eNBs (ScNBs)

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Conventional communication techniques do not provide a way for a legacy wireless User Equipment (UE) or wireless mobile station to distinguish between a legacy downlink signal and a New Carrier Type (NCT) downlink signal, thereby running the risk that the legacy UE (or MS) adversely consumes excess processing power and battery power by attempting to connect to a NCT that is unavailable to the legacy UE (or MS).

Embodiments of the subject matter disclosed herein relate to techniques for indicating whether a downlink signal of a $3^{rd}$ Generation Partnership Project (3GPP) Long Term Evolution (LTE) downlink signal is a NCT downlink signal or a legacy downlink signal so that a legacy UE can avoid attempting to connect to a NCT downlink signal that is unavailable to the UE. More specifically, embodiments of the subject matter disclosed herein relate to techniques for providing information as part of the Primary Synchronization Signal/Secondary Synchronization Signal (PSS/SSS) of a downlink signal that indicates that the downlink signal is a NCT so that a legacy UE does not continue decoding the Physical Broadcast Channel/System Information Block (PBCH/SIB) or attempt measurement of the Reference Signal Received Power/Reference Signal Received Quality (RSRP/RSRQ) of the Cell Specific Reference Signal (CRS), and thereby conserves processing power and battery power. Moreover, additional exemplary embodiments of the subject matter disclosed herein provides information in a PSS/SSS 3GPP LTE downlink signal that can be used for another purpose (i.e., not limited to indicating carrier type).

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described herein as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments. Additionally, in the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Two types of New Carrier Types (NCTs) are being considered. The first type is a non-stand-alone NCT in which initial-access functionality for UEs would not need to be supported. The second type is a stand-alone NCT in which initial-access functional for UEs would be supported.

FIG. 1 depicts an exemplary embodiment of a 3GPP LTE communication system 100 comprising a plurality of Master Evolved Node Bs (MeNBs) 101 and Secondary eNodeBs (SeNBs) 102, of which not all of the SeNBs depicted in FIG. 1 are indicated. MeNBs 101 generally provide macro coverage for an area and can include one or more non-stand-alone NCT SeNBs 102a that may be collocated with a MeNB. Some SeNBs 102b comprise a stand-alone NCT and are generally not collocated with a MeNB 101. Stand-alone NCT SeNBs that are not collocated with a MeNB 101 are indicated by 103

In a situation in which a MeNB 101 and a non-stand-alone NCT SeNB 102a are collocated (for example, indicated by 103), the timing difference between the MeNB 101 and the NCT SeNB 102a at a User Equipment (UE) would be similar, so the timing synchronization measurement of the MeNB 101 could be reused by a UE for timing synchronization with the SeNB 102b. In a situation in which a MeNB 101 and a NCT SeNB 102a are collocated with intra-band Carrier Aggregation (CA) (for example, indicated by 103), the frequency offset measurement of the MeNB could be used for the SeNB 102b due to possibly the same RF front ends and/or the same Doppler shifts.

In a situation in which a MeNB 101 and a stand-alone NCT SeNB 102b are non-collocated CA and or inter-band CA (for example, indicated by 105), the initial-access functionality for the stand-alone NCT would need to provide a synchronization signal (SS), a Physical Broadcast Channel (PBCH), a Physical Hybrid-ARQ Indicator Channel (PHICH), a Physical Control Format Indicator Channel (PCFICH), and a Physical Downlink Control Channel (PDCCH), in addition to an independent tracking Reference Signal (RS). Moreover, if the CRS of the NCT is degenerated by reducing the density of CRS in both the frequency domain and the time domain, the legacy control channels (e.g., PBCH, PHICH, PCFICH, PDCCH) that rely on CRS for demodulation would need to be modified and/or enhanced for the stand-alone NCT.

A legacy synchronization signal (SS) comprises a Primary Synchronization Signal (PSS) and a Secondary Synchronization Signal (SSS) in which the PSS containing cell ID information within a cell group can be used for frequency and timing synchronization and the SSS can include identification information for a base station (e.g., cell ID group information, cell ID within a group information), frame boundary detection information, and Cyclic Prefix (CP) detection.

If the PSS/SSS synchronization signals for a NCT (non-stand-alone or stand-alone) are the same as that for a legacy carrier, a new release UE (e.g., a Release 12 UE or later) would not be able to distinguish whether the carrier is a legacy carrier or a new-release carrier during cell search step. For example, a new release UE may enter a Radio Resource Management (RRM) measurement using CRS followed by successful PSSSSS detection and the UE cannot know the exact structures for P-BCH, common search space (CSS) for a new PXDCCH, CRS, etc. on the NCT, which requires the blind decoding for all physical channels and signals followed by PSS/SSS detection resulting in the unnecessary power consumption. Moreover, a legacy UE may experience unnecessary power consumption if the legacy UE attempts to access a NCT that is unavailable to the legacy UE. For example, when a legacy UE is powered on or a Radio Resource Control (RRC) connection is lost, an initial cell search will be conducted by frequency raster scanning, by time/frequency synchronization, and by cell ID detection. After detecting the PSSSSS, a legacy UE will try to decode the Physical Broadcast Channel (PBCH) and, if successful, will decode the System Information Block (SIB). At that time, the legacy UE may become aware that the accessed carrier is not available to the legacy UE, resulting in unnecessary power consumption by the UE.

As another example, when a legacy UE is in an RRC_CONNECTED or an RRC_IDLE state, a neighbor cell search will be conducted to measure the signal qualities (RSRP and RSRQ) of the neighbor cell. Typically, a UE will autonomously perform a neighbor cell search without assisting information for intra-frequency measurement. In this situation, the legacy UE could detect the PSS/SSS from a neighboring NCT cell, and then would decode P-BCH, measure RSRP/RSRQ using CRS from the neighbor cell, even if the NCT carrier is not available to the legacy UE. This sequence would also result in unnecessary power consumption for the legacy UE.

According to a first exemplary embodiment of the subject matter disclosed herein, additional PSS-based scrambling codes are used in the Secondary Synchronization Signal (SSS) portion of the Synchronization Signal (SS) (also referred to as the Secondary Synchronization Channel (SSC, SSCH or S-SCH). In particular, embodiments of the subject matter disclosed herein utilize six additional SSS sequences beyond the existing sequences used for legacy UEs. For example, the legacy sequence structure for the SSS is an interleaved concatenation of two length-31 binary sequences d(2n) and d(2n+1). The combination of the two length-31 sequences that define the SSS differ between subframe 0 and subframe 5 as $$d(2n) = \begin{cases} s_0^{(m_0)}(n)c_0(n) & \text{in subframe } 0 \\ s_1^{(m_1)}(n)c_0(n) & \text{in subframe } 5 \end{cases} \quad (1)$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

in which $0 \le n \le 30$, and the indices $m_0$ and $m_1$ are derived from the physical-layer cell-identity group $N_{ID}^{(1)}$ according to $$m_0 = m' \bmod 31$$
$$m_1 = (m_0 + \lfloor m'/31 \rfloor + 1) \bmod 31 \quad (2)$$
$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

in which $N_{ID}^{(1)}$ is in the range of 0 to 167, inclusive, and represents the physical-layer cell-identity group. The two sequences $s_0^{(m_0)}(n)$ and $s_1^{(m_1)}(n)$ are defined as two different cyclic shifts of the m-sequence $\tilde{s}(n)$ according to $$s_0^{(m_0)}(n) = \tilde{s}((n+m_0) \bmod 31)$$
$$s_1^{(m_1)}(n) = \tilde{s}((n+m_1) \bmod 31) \quad (3)$$

in which $\tilde{s}(i)=1-2x(i)$, $0 \le i \le 30$, is defined by $$x(\bar{i}+5)=(x(\bar{i}+2)+x(\bar{i})) \bmod 2, \ 0 \le \bar{i} \le 25 \quad (4)$$

with initial conditions $x(0)=0$, $x(1)=$, $x(2)=0$, $x(3)=0$, $x(4)=1$.

Scrambling sequences $z_1^{(m_0)}(n)$ and $z_1^{(m_1)}(n)$ are defined by a cyclic shift of the m-sequence $\tilde{z}(n)$ according to $$z_1^{(m_0)}(n)=\tilde{z}((n+(m_0 \bmod 8)) \bmod 31) \quad (5)$$

and $$z_1^{(m_1)}(n)=\tilde{z}((n+(m_1 \bmod 8)) \bmod 31) \quad (6)$$

in which $m_0$ and $m_1$ are well known and can be obtained from Table 6.11.2.1-1 of the LTE; Evolved Universal Terrestrial Radio Access (E-UTRA); Physical channels and modulation Technical Specification TS36.211 V8.8.0 (3GPP TS 36.211 version 8.8.0 Release 8) and $\tilde{z}(i)=1-2x(i)$, $0 \le i \le 30$, is defined by $$x(\bar{i}+5)=(x(\bar{i}+4)+x(\bar{i}+2)+x(\bar{i}+1)+x(\bar{i})) \bmod 2, \ 0 \le \bar{i} \le 25 \quad (7)$$

with initial conditions $x(0)=0$, $x(1)=0$, $x(2)=0$, $x(3)=0$, $x(4)=1$.

For a legacy carrier, scrambling sequences $c_0(n)$ and $c_1(n)$ are defined as $$c_0(n)=\tilde{c}((n+N_{ID}^{(2)}) \bmod 31)$$
$$c_1(n)=\tilde{c}((n+N_{ID}^{(2)}+3) \bmod 31) \quad (8)$$

in which $N_{ID}^{(2)}$ is in the range of 0 to 2, inclusive, and is the physical-identity of the physical-layer identity group $N_{ID}^{(1)}$ for the downlink signal, and $\tilde{c}(i)=1-2x(i)$, $0 \le i \le 30$, is defined by $$x(\bar{i}+5)=(x(\bar{i}+3)+x(\bar{i})) \bmod 2, \ 0 \le \bar{i} \le 25 \quad (9)$$

with initial conditions $x(0)=0$, $x(1)=0$, $x(2)=0$, $x(3)=0$, $x(4)=1$.

In contrast to a legacy carrier, embodiments of the subject matter disclosed herein define scrambling sequences $c_0(n)$ and $c_1(n)$ differently from the legacy approach so that a NCT can be distinguished from a legacy carrier early during an initial cell search or a neighbor cell search process. That is, for a new carrier type, scrambling sequences $c_0(n)$ and $c_1(n)$, which are generated based on PSS code $N_{ID}^{(2)}$, are defined as $$c_0(n)=\tilde{c}_m$$
$$c_1(n)=\tilde{c}_n \quad (10)$$

in which scrambling sequences $\tilde{c}_m$ and $\tilde{c}_n$ can be any type of sequence, such as, but not limited to a pseudo random sequence, a Zadoff-Chu (ZC) sequence, a gold code, an m-sequence and/or a combination thereof. In one alternative exemplary embodiment, sequences $\tilde{c}_m$ and $\tilde{c}_n$ can be generated by a cyclic-shifted version from an m-sequence of a polynomial of $\tilde{c}=x^5+x^3+1$. For this alternative exemplary embodiment, given that $\tilde{c}(0), \ldots \tilde{c}(5)$ are already used for a is legacy carrier, additional sequences $\tilde{c}(6), \ldots \tilde{c}(11)$ could be used for a NCT. That is, Eq. (10) can be defined for a NCT as $$c_0(n)=\tilde{c}_m=\tilde{c}((6+n+N_{ID}^{(2)}) \bmod 31)$$
$$c_0(n)=\tilde{c}_n=\tilde{c}((6+n+N_{ID}^{(2)}+3) \bmod 31) \quad (11)$$

Accordingly, Eq. (11) can be generalized as $$c_0(n)=\tilde{c}_m=\tilde{c}((X_c+n+N_{ID}^{(2)}) \bmod 31)$$
$$c_1(n)=\tilde{c}_n=\tilde{c}((X_c+n+N_{ID}^{(2)}+3) \bmod 31) \quad (12)$$

in which $X_c$ is an integer value (e.g., a negative integer, zero, or a positive integer). According to embodiments disclosed herein, $X_c$ comprises any positive integer value other than 0, 1, 2, 3, 4, and 5 because those values have already used for the legacy system. That is, in Eq. (11), $X_c=6$ is selected in order to differentiate from the legacy scrambling sequences.

Figure 2:
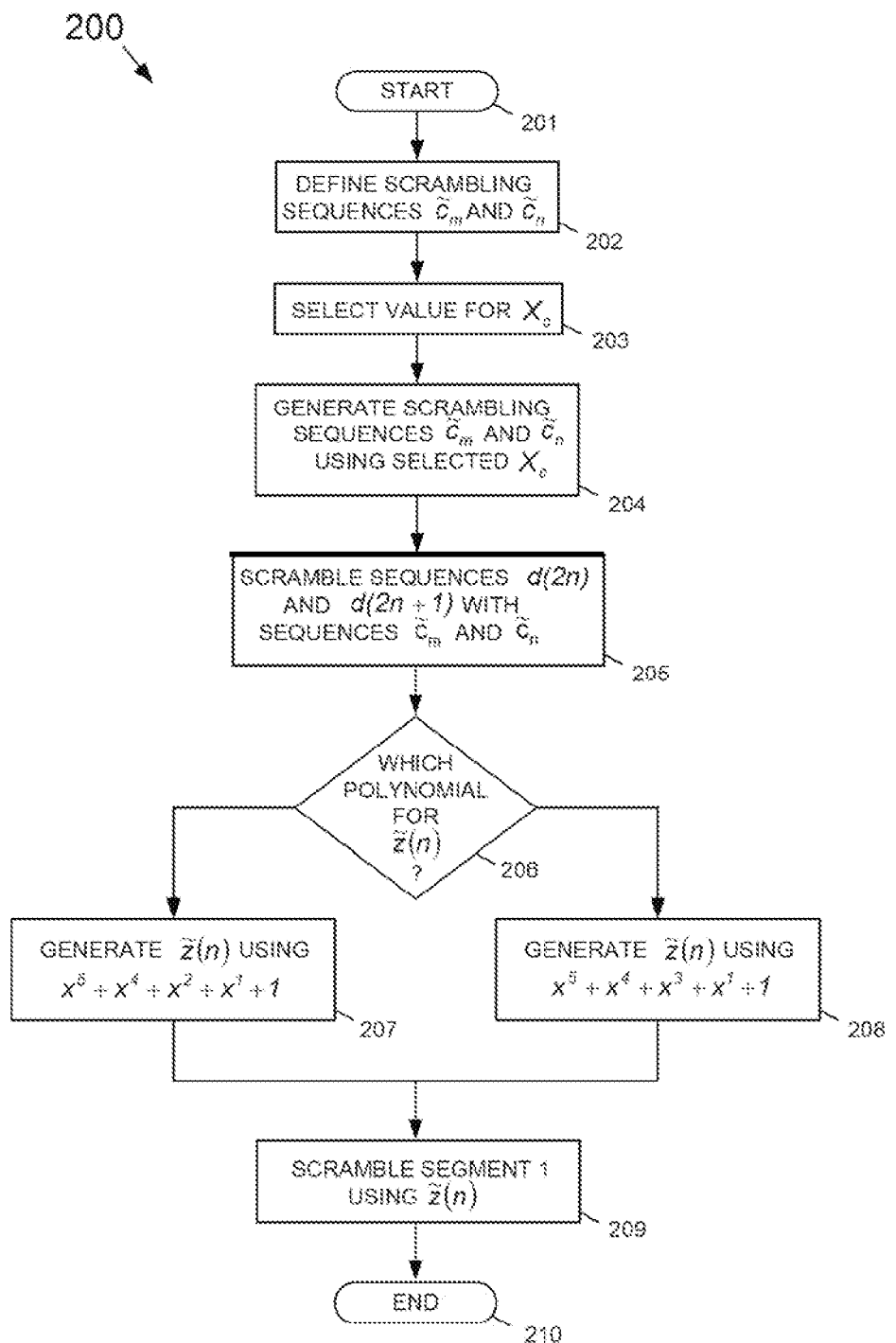
FIG. 2 depicts a flow diagram of an exemplary embodiment utilizing scrambling sequences $\tilde{c}_m$ and $\tilde{c}_n$ according to the subject matter disclosed herein.

FIG. 2 depicts a flow diagram 200 of an exemplary embodiment utilizing scrambling sequences $\tilde{c}_m$ and $\tilde{c}_n$ according to the subject matter disclosed herein. At 201, the process begins. At 202, scrambling sequences $\tilde{c}_m$ and $\tilde{c}_n$ defined as in Eq. (5). At 203, the value for $X_c$ is selected to be any positive integer value other than 0-5, inclusive. At 244, scrambling sequences $\tilde{c}_m$ and $\tilde{c}_n$ are generated using the selected $X_c$. At 205, binary sequences d(2n) and d(2n+1) are respectively scrambled by scrambling sequences $\tilde{c}_m$ and $\tilde{c}_n$. It should be understood that operations 202, 203, 204 and 205 could be combined in to fewer operations than indicated in FIG. 2.

In one alternative exemplary embodiment, the polynomial $x^5+x^4+x^2+x^1+1$ can be used for the $\tilde{z}(n)$ segment 1 scrambling. From Eqs. (11) and (12), $$c_0(n)=\tilde{c}_m=\tilde{z}((8+n+N_{ID}^{(2)}) \bmod 31)$$
$$c_1(n)=\tilde{c}_n=\tilde{z}((8+n+N_{ID}^{(2)}+3) \bmod 31) \quad (13)$$

or, more generally $$c_0(n)=\tilde{c}_m=\tilde{z}((X_c+n+N_{ID}^{(2)})\bmod 31)$$

$$c_1(n)=\tilde{c}_n=\tilde{z}((X_c+n+N_{ID}^{(2)}+3)\bmod 31) \quad (14)$$

In Eq. (13), $X_c=8$ is selected in order to differentiate the sequences of embodiments of the subject matter disclosed herein from what has already used for legacy segment 1 scrambling.

The polynomial $x^5+x^4+x^3+x^1+1$, which has a duality relationship with the legacy polynomial $x^5+x^4+x^2+x^1+1$, can be used for generating a scrambling sequence $\tilde{y}$ to share the same registers and to have better cross-correlation using the following equation.

$$x(\tilde{i}+5)=(x(\tilde{i}+4)+x(\tilde{i}+3)+x(\tilde{i}+1)+x(\tilde{i}))\bmod 2, \ 0 \leq \tilde{i} \leq 25 \quad (15)$$

Then, scrambling sequences $\tilde{c}_m$ and $\tilde{c}_n$ become $$c_0(n)=\tilde{c}_m=\tilde{y}((n+N_{ID}^{(2)})\bmod 31)$$

$$c_1(n)=\tilde{c}_n=\tilde{y}((n+N_{ID}^{(2)}+3)\bmod 31) \quad (16)$$

or, more generally $$c_0(n)=\tilde{c}_m=\tilde{y}((X_y+n+N_{ID}^{(2)})\bmod 31)$$

$$c_1(n)=\tilde{c}_n=\tilde{y}((X_y+n+N_{ID}^{(2)}+3)\bmod 31) \quad (17)$$

In Eq. (16), $X_y=0$ is selected for simplicity. It should be understood that values other than $X_y=0$ could be selected for $X_y$.

Returning to FIG. 2, at 206 it is determined whether the polynomial $x^5+x^4+x^2+x^1+1$ or the polynomial $x^5+x^4+x^3+x^1+1$ will be used for the $\tilde{z}(n)$ segment 1 scrambling. If polynomial $x^5+x^4+x^2+x^1+1$ is to be used, flow continues to 207 where the $\tilde{z}(n)$ segment 1 scrambling is generated. Flow continues to 209 where segment 1 is scrambled with $\tilde{z}(n)$. Flow continues to 210 where the process ends.

If, at 206, it is determined that the polynomial $x^5+x^4+x^3+x^1+1$ will be used for the $\tilde{z}(n)$ segment 1 scrambling, flow continues to 208 where the $\tilde{z}(n)$ segment 1 scrambling is generated. Flow continues to 209 where segment 1 is scrambled with $\tilde{z}(n)$. Flow continues to 210 where the process ends.

Figure 3:
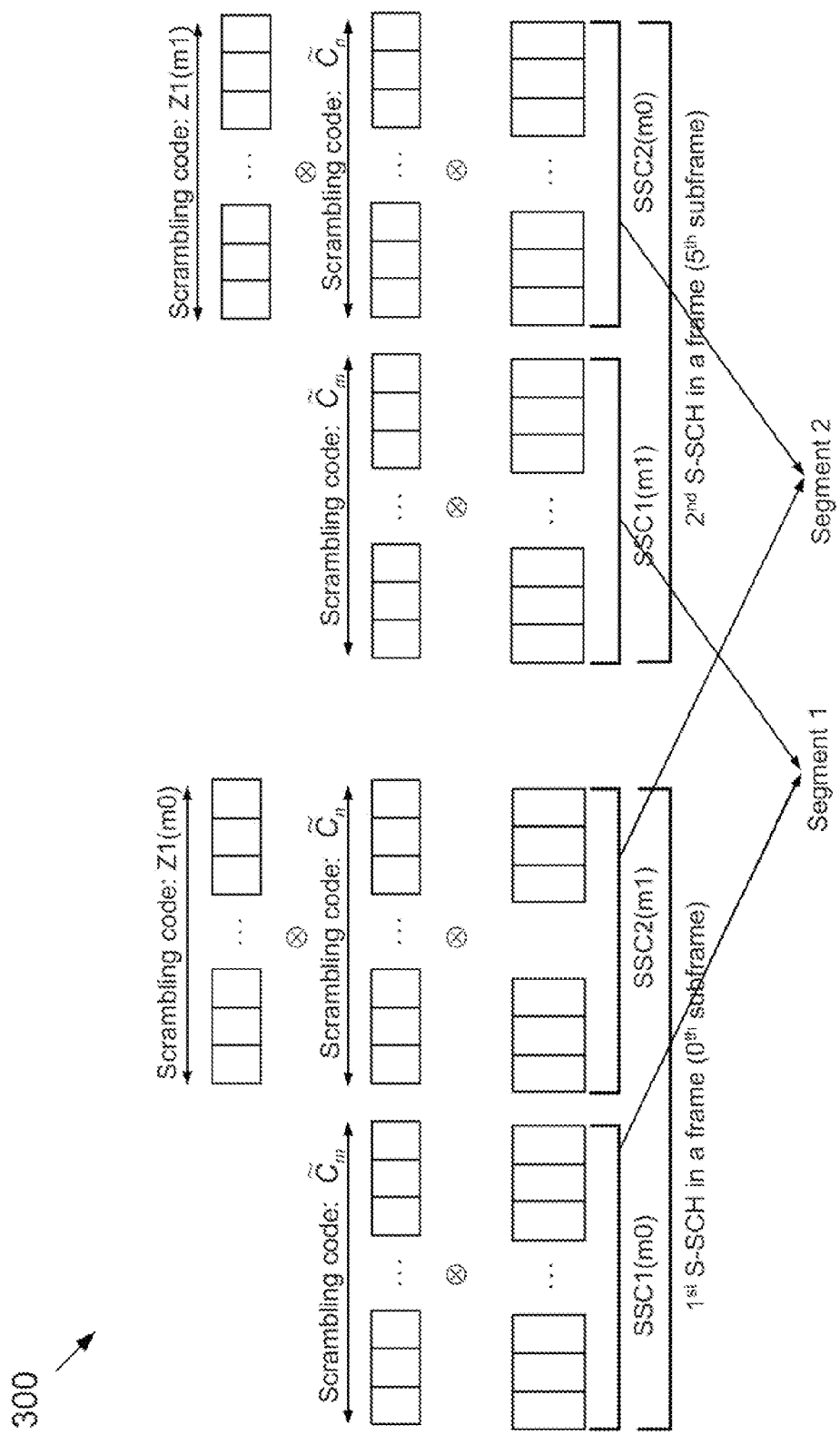
FIG. 3 depicts a sequence structure for the first exemplary embodiment of a Secondary Synchronization Signal (SSS) according to the subject matter disclosed herein.

FIG. 3 depicts a sequence structure for the first exemplary embodiment of a Secondary Synchronization Signal (SSS) 300 (according to the subject matter disclosed herein. As depicted in FIG. 3, the two length-31 sequences d(2n) and d(2n+1) (indicated as S-SCH 2, in FIG. 3) for subframes 0 and 5 are scrambled according to the two sequences $s_0^{(m_0)}(n) \ and \ s_1^{(m_1)}(n)$ (e.g., Eq. (3)). Scrambling sequences $\tilde{c}_m$ and $\tilde{c}_n$ according to the subject matter disclosed herein further scramble subframes 0 and 5. Lastly, $\tilde{z}(n)$ segment 1 scrambling is applied according to the subject matter disclosed herein.

According to a second exemplary embodiment of the subject matter disclosed herein, an additional scrambling sequence is used that indicates a New Carrier Type (NCT) and that can be used on top of other scrambling sequences, such as legacy scrambling sequences and/or scrambling sequences. More specifically, for a NCT the SSS sequence structure is defined as $$d(2n) = \begin{cases} s_0^{(m_0)}(n)c_0(n)c_2(n) & \text{in subframe 0} \\ s_1^{(m_1)}(n)c_0(n)c_2(n) & \text{in subframe 5} \end{cases} \quad (18)$$

$$d(2n+1) = \begin{cases} s_1^{(m_1)}(n)c_1(n)z_1^{(m_0)}(n)c_3(n) & \text{in subframe 0} \\ s_0^{(m_0)}(n)c_1(n)z_1^{(m_1)}(n)c_3(n) & \text{in subframe 5} \end{cases}$$

in which scrambling sequences $c_2(n)$ and $c_3(n)$ can be any type of sequence, such as, but not limited to, a pseudo random sequence, a Zadoff-Chu (ZC) sequence, a gold code, an m-sequence, or a combination thereof. The other variables in Eq. (18) are defined the same as the variables in Eqs. (1)-(9). To reuse the existing/legacy scrambling-sequence generator for convenience and to have good cross-correlation properties, the same m-sequence generated from polynomial $x^5+x^3+1$ as $c_0(n)$ and $c_1(n)$ is be used for $c_2(n)$ and $c_3(n)$ with a cyclic shift applied to the m-sequence. For example, $$c_2(n)=\tilde{c}((N_0+n)\bmod 31)$$

$$c_3(n)=\tilde{c}((N_1+1+n)\bmod 31) \quad (19)$$

in which $N_0$ and $N_1$ are integer values. If, for example, $N_0=N_1=6$ is selected to differentiate the additional scrambling sequences from legacy PSS-based scrambling, then $$c_2(n)=\tilde{c}((6+n)\bmod 31)$$

$$c_3(n)=\tilde{c}((6+1+n)\bmod 31) \quad (20)$$

Figure 4:
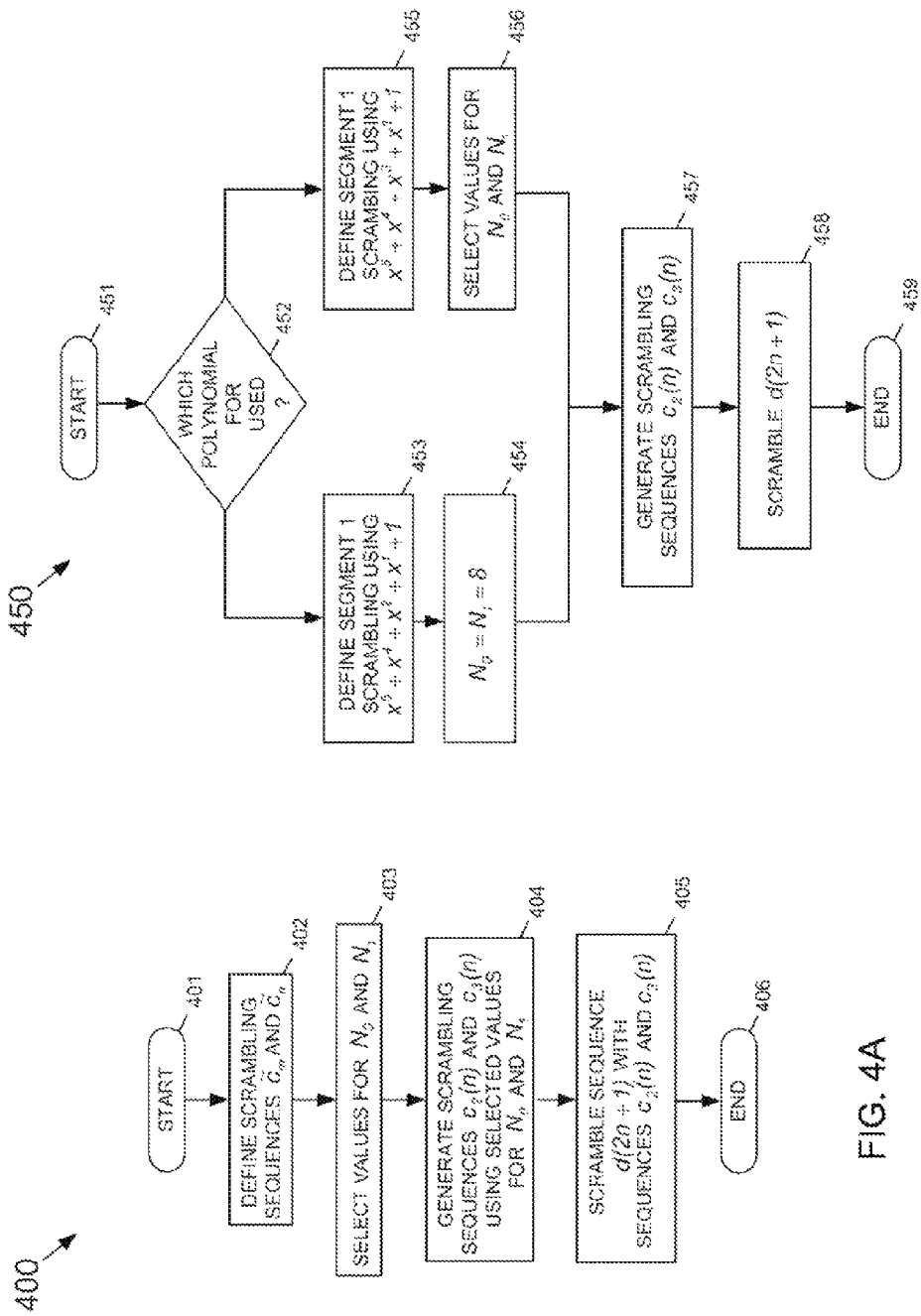
FIG. 4A depicts a flow diagram of an exemplary embodiment utilizing scrambling sequences $c_2(n)$ and $c_3(n)$ in which the polynomial $x^5+x^3+1$ is used for generating scrambling sequences $c_2(n)$ and $c_3(n)$ according to the subject matter disclosed herein.
FIG. 4B depicts a flow diagram of an exemplary embodiment utilizing scrambling sequences $c_2(n)$ and $c_3(n)$ in which alternative $\tilde{z}(n)$ segment 1 scrambling sequences are used according to the subject matter disclosed herein.

FIG. 4A depicts a flow diagram 400 of an exemplary embodiment utilizing scrambling sequences $c_2(n)$ and $c_3(n)$ in which the polynomial $x^5+x^3+1$ is used for generating scrambling sequences $c_2(n)$ and $c_3(n)$ according to the subject matter disclosed herein. At 401, the process begins. At 402, scrambling sequences $c_2(n)$ and $c_3(n)$ are defined as in Eq. (20). At 403, $N_0=N_1=6$ is selected. It should be understood that $N_0$ and $N_1$ could be is selected to be any positive integer value other than 0-5, inclusive. Additionally, it should be understood that the values for $N_0$ and $N_1$ could be selected to be not equal to each other. At 404, scrambling sequences $c_2(n)$ and $c_3(n)$ are generated using the value(s) selected for $N_0$ and $N_1$. At 405, binary sequence d(2n+1) is scrambled by scrambling sequences $c_2(n)$ and $c_3(n)$. The process ends at 406. It should be understood that operations 402, 403, 404 and 405 could be combined into fewer operations than indicated in FIG. 4A.

For an alternative exemplary embodiment, if the same polynomial $x^5+x^4+x^2+x^1+1$ as is used for $\tilde{z}(n)$ is used for scrambling sequences to generate scrambling sequences $c_2(n)$ and $c_3(n)$, then $$c_2(n)=\tilde{z}((N_0+n)\bmod 31)$$

$$c_3(n)=\tilde{z}((N_1+1+n)\bmod 31) \quad (21)$$

Further, if, for example, $N_0=N_1=8$ is selected in order to differentiate the additional scrambling sequences from the legacy $\tilde{z}(n)$ segment 1 scrambling, then $$c_2(n)=\tilde{z}((8+n)\bmod 31)$$

$$c_3(n)=\tilde{z}((8+1+n)\bmod 31) \quad (22)$$

Alternatively, the polynomial $x^5+x^4+x^2+x^1+1$, which has a duality relationship with the legacy polynomial $x^5+x^4+x^2+x^1+1$, could be used for generating a new scrambling sequence $\tilde{y}$ to share the same registers and to have better cross-correlation than when Eq. (21) is used for scrambling sequences $c_2(n)$ and $c_3(n)$. If the polynomial $x^5+x^4x^3x^1+1$ is used for $\tilde{y}(n)$, then $c_2(n)=\tilde{y}((N_0+n)\bmod 31)$ $c_3(n)=\tilde{y}((N_1+1+n)\bmod 31)$ (23)

in which $N_0=N_1=8$ is selected for simplicity. More generally, $c_2(n)=\tilde{y}((n)\bmod 31)$ $c_3(n)=\tilde{y}((1+n)\bmod 31)$ (24)

It should be understood that if the polynomial $x^5+x^4+x^3+x^1+1$ is used for $\tilde{y}(n)$, integer values other than $N_0=N_1=8$ could be selected for $N_0$ and $N_1$. Additionally, it should be understood that the values for $N_0$ and $N_1$ could be selected to be not equal to each other.

FIG. 4B depicts a flow diagram 450 of an exemplary embodiment utilizing scrambling sequences $c_2(n)$ and $c_3(n)$ in which alternative $\tilde{z}(n)$ segment 1 scrambling sequences are used according to the subject matter disclosed herein. At 451, the process begins, and flow continues to 452 where it is determined whether the polynomial $x^5+x^4+x^2+x^1+1$ or the polynomial $x^5+x^4+x^3+x^1+1$ will be used for generating the $c_2(n)$ and $c_3(n)$ segment 1 scrambling sequences. If polynomial $x^5+x^4+x^2+x^1+1$ is to be used, flow continues to 453 where the $c_2(n)$ and $c_3(n)$ segment 1 scrambling sequences are defined as in Eq. (21). Flow continues to 454 where $N_0=N_1=8$ is selected. It should be understood that $N_0$ and $N_1$ could be is selected to be any positive integer value other than 0-7, inclusive. Additionally, it should to be understood that the values for $N_0$ and $N_1$ could be selected to be not equal to each other.

Flow continues to 457 where scrambling sequences $c_2(n)$ and $c_3(n)$ are generated using the value(s) selected for $N_0$ and $N_1$. At 458, binary sequence $d(2n+1)$ is scrambled by scrambling sequences $c_2(n)$ and $c_3(n)$. The process ends at 459.

If at 452, it is determined that the polynomial $x^5+x^4+x^3+x^1+1$ is used for generating the $c_2(n)$ and $c_3(n)$ segment 1 scrambling sequences, flow continues to 455 where the $c_2(n)$ and $c_3(n)$ segment 1 scrambling sequences are defined as in Eq. (23). Flow continues to 454 where the values for $N_0$ and $N_1$ are selected. Flow continues to 457 where scrambling sequences $c_2(n)$ and $c_3(n)$ are generated using the value(s) selected for $N_0$ and $N_1$. At 458, binary sequence $d(2n+1)$ is scrambled by scrambling sequences $c_2(n)$ and $c_3(n)$. The process ends at 459.

In summary, for the second exemplary embodiment, $$d(2n) = \begin{cases} s_0^{(m_0)}(n)c_0(n)c_2(n) & \text{in subframe } 0 \\ s_1^{(m_1)}(n)c_0(n)c_2(n) & \text{in subframe } 5 \end{cases}$$ (25)

$$d(2n+1) = \begin{cases} s_1^{(m_1)}(n)c_1(n)z_1^{(m_0)}(n)c_3(n) & \text{in subframe } 0 \\ s_0^{(m_0)}(n)c_1(n)z_1^{(m_1)}(n)c_3(n) & \text{in subframe } 5 \end{cases}$$

in which for a legacy carrier, $c_2(n)=1$ $c_3(n)=1$ (26)

and for a NCT, $c_2(n)=\tilde{c}((6+n)\bmod 31)$ $c_3(n)=\tilde{c}((6+1+n)\bmod 31)$ (27)

Equation (27) can be generalized below as $c_2(n)=\tilde{c}((Y_c+n)\bmod 31)$ $c_3(n)=\tilde{c}((Y_c+1+n)\bmod 31)$ (28)

in which $Y_c$ is an integer value (e.g., a negative integer, zero, or a positive integer).

Figure 5:
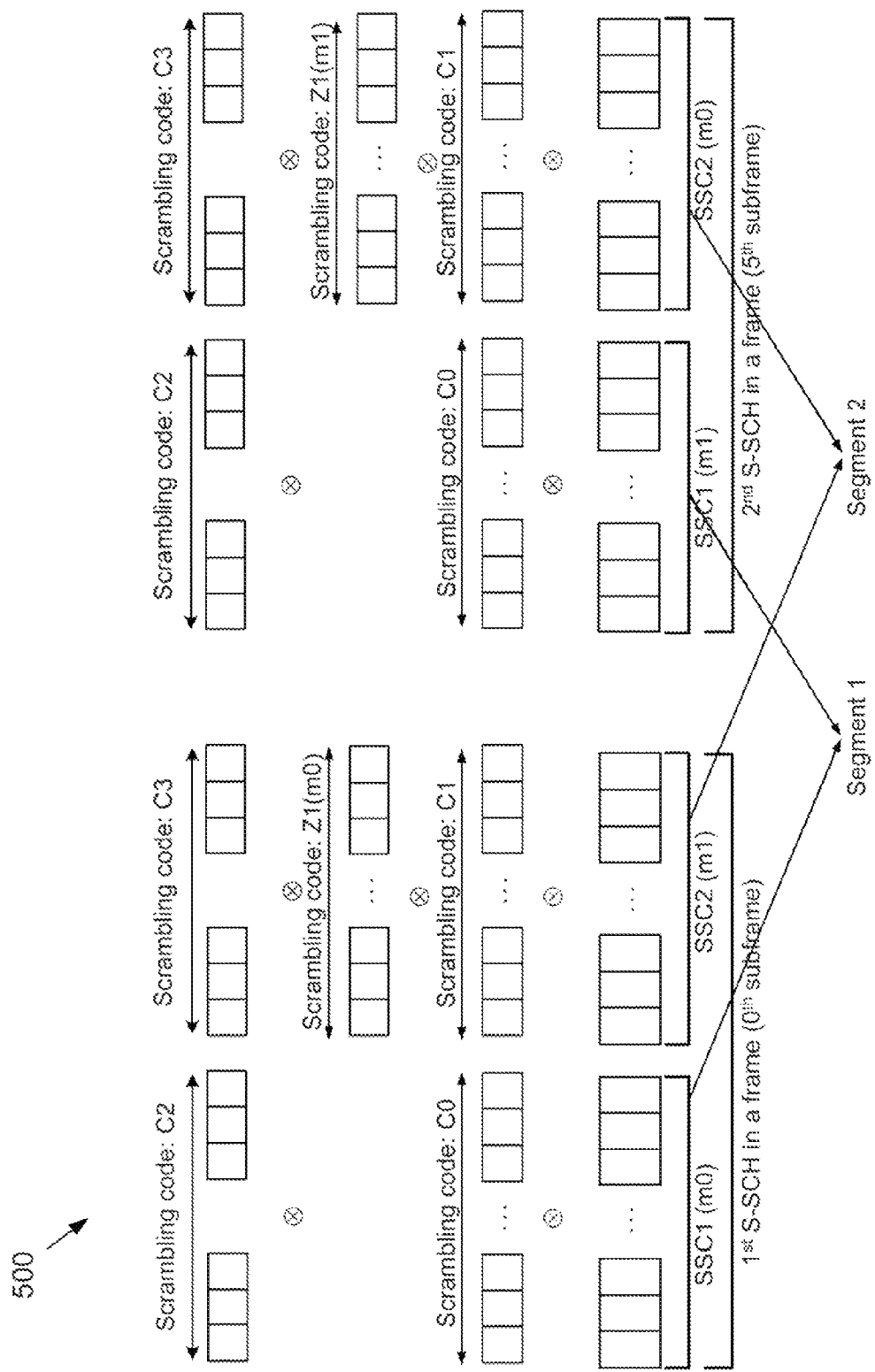
FIG. 5 depicts a sequence structure for the second exemplary embodiment of a Secondary Synchronization Signal (SSS) according to the subject matter disclosed herein.

FIG. 5 depicts a sequence structure for the second exemplary embodiment of a Secondary Synchronization Signal (SSS) 500 according to the subject matter disclosed herein. As depicted in FIG. 5, the two length-31 sequences $d(2n)$ and $d(2n+1)$ (indicated as S-SCHF in FIG. 5) for subframes 0 and 5 are scrambled according to the two sequences $s_0^{(m_0)}(n)$ and $s_1^{(m_1)}(n)$ (Eq. (3)). Scrambling sequences $c_0(n)$ and $c_1(n)$ (Eq. (8)) further scramble subframes 0 and 5, followed by $\tilde{z}(n)$ segment 1 scrambling. Lastly, scrambling sequences $c_2(n)$ and $c_3(n)$ are applied according to the subject matter disclosed herein.

According to a third exemplary embodiment of the subject matter disclosed herein, the Secondary Scrambling Code (SSC1) (e.g., $s_0^{(m_0)}$) and Secondary Scrambling Code (SSC2) (e.g., $s_1^{(m_1)}$) can be rearranged in a number of different ways to indicate a NCT. For example, if SSC1 and SSC2 are not swapped between subframes, a legacy carrier is indicated, whereas if SSC1 and SSC2 are swapped between subframes, a NCT is indicated. That is, the order of $<s_0^{(m_0)}, s_1^{(m_1)}>$ for $d(2n)$ represents a legacy carrier, whereas the order of $<s_1^{(m_1)}, s_0^{(m_0)}>$ for $d(2n)$ represents a NCT. Thus, a NCT is indicated by $$d(2n) = \begin{cases} s_1^{(m_1)}(n)c_0(n) & \text{in subframe } 0 \\ s_0^{(m_0)}(n)c_0(n) & \text{in subframe } 5 \end{cases}$$ (29)

$$d(2n+1) = \begin{cases} s_0^{(m_0)}(n)c_1(n)z_1^{(m_0)}(n) & \text{in subframe } 0 \\ s_1^{(m_1)}(n)c_1(n)z_1^{(m_1)}(n) & \text{in subframe } 5 \end{cases}$$

Alternatively, the $z_1$ segment 1 scrambling can also be swapped between subframes (with the $s_0^{(m_0)}$ and $s_1^{(m_1)}$ scrambling code also swapped between subframes) to indicate a NCT as $$d(2n) = \begin{cases} s_1^{(m_1)}(n)c_0(n) & \text{in subframe } 0 \\ s_0^{(m_0)}(n)c_0(n) & \text{in subframe } 5 \end{cases}$$ (30)

$$d(2n+1) = \begin{cases} s_0^{(m_0)}(n)c_1(n)z_1^{(m_1)}(n) & \text{in subframe } 0 \\ s_1^{(m_1)}(n)c_1(n)z_1^{(m_0)}(n) & \text{in subframe } 5 \end{cases}$$

As yet another exemplary alternative embodiment, the $z_1$ segment 1 scrambling can be swapped together between segments (with the $s_0^{(m_0)}$ and $s_1^{(m_1)}$ scrambling code also swapped between subframes) to indicate a NCT as $$d(2n) = \begin{cases} s_1^{(m_1)}(n)c_0(n)z_1^{(m_0)}(n) & \text{in subframe } 0 \\ s_0^{(m_0)}(n)c_0(n)z_1^{(m_1)}(n) & \text{in subframe } 5 \end{cases}$$ (31)

$$d(2n+1) = \begin{cases} s_0^{(m_0)}(n)c_1(n) & \text{in subframe } 0 \\ s_1^{(m_1)}(n)c_1(n) & \text{in subframe } 5 \end{cases}$$

Still another exemplary alternative embodiment provides that the $z_1$ segment 1 scrambling for the exemplary alternative embodiment shown in Eq. (31) is swapped between subframes to indicate a NCT as $$d(2n) = \begin{cases} s_1^{(m_1)}(n)c_0(n)z_1^{(m_1)}(n) & \text{in subframe 0} \\ s_0^{(m_0)}(n)c_0(n)z_1^{(m_0)}(n) & \text{in subframe 5} \end{cases} \quad (32)$$

$$d(2n+1) = \begin{cases} s_0^{(m_0)}(n)c_1(n) & \text{in subframe 0} \\ s_1^{(m_1)}(n)c_1(n) & \text{in subframe 5} \end{cases}$$

Another exemplary alternative embodiment provides that the $z_1$ segment 1 scrambling only is swapped between segments with the $s_0^{(m_0)}$ and $s_1^{(m_1)}$ scrambling code not being swapped between subframes. That is, a NCT is indicated as $$d(2n) = \begin{cases} s_0^{(m_0)}(n)c_0(n)z_1^{(m_0)}(n) & \text{in subframe 0} \\ s_1^{(m_1)}(n)c_0(n)z_1^{(m_1)}(n) & \text{in subframe 5} \end{cases} \quad (33)$$

$$d(2n+1) = \begin{cases} s_1^{(m_1)}(n)c_1(n) & \text{in subframe 0} \\ s_0^{(m_0)}(n)c_1(n) & \text{in subframe 5} \end{cases}$$

Yet another exemplary embodiment provides that the $z_1$ segment 1 scrambling swapped between segments (like that of Eq. (19)) and then further swapped between subframes (with the $s_0^{(m_0)}$ and $s_1^{(m_1)}$ scrambling code not being swapped between subframes) to indicate a NCT as $$d(2n) = \begin{cases} s_0^{(m_0)}(n)c_0(n)z_1^{(m_1)}(n) & \text{in subframe 0} \\ s_1^{(m_1)}(n)c_0(n)z_1^{(m_0)}(n) & \text{in subframe 5} \end{cases} \quad (34)$$

$$d(2n+1) = \begin{cases} s_1^{(m_1)}(n)c_1(n) & \text{in subframe 0} \\ s_0^{(m_0)}(n)c_1(n) & \text{in subframe 5} \end{cases}$$

It should be understood that the different exemplary embodiments disclosed herein can be used alone or together in various combinations and permutations with the other exemplary embodiments disclosed herein. Moreover, the technique disclosed herein can be used for providing information in a PSS/SSS 3GPP LTE downlink signal that can be used for another purpose (i.e., not limited to indicating carrier type). For instance, the information disclosed in accordance with the subject matter disclosed herein could be used to indicate, for example, a small cell or SeNB that a legacy UE cannot access.

Figure 6:
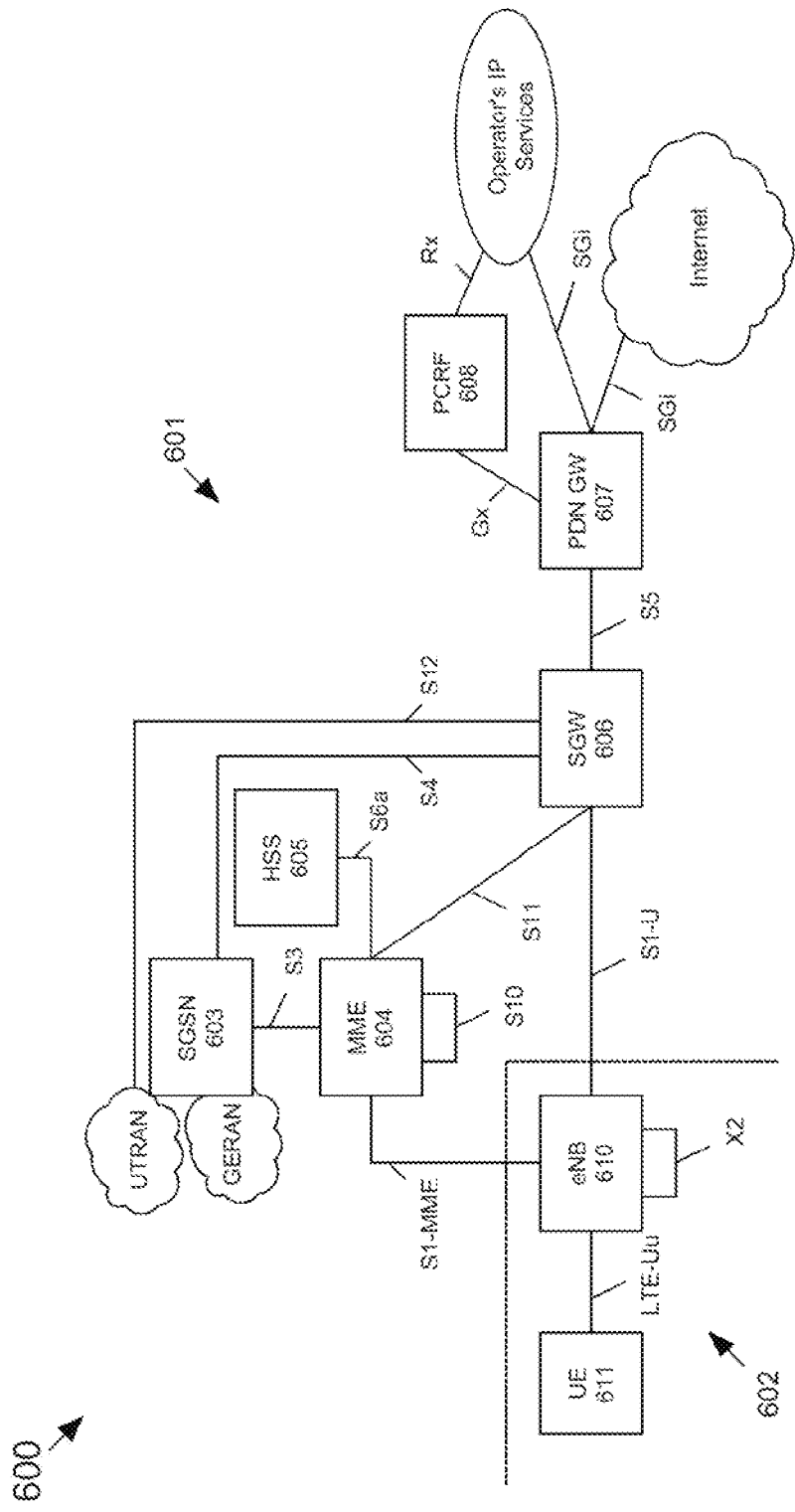
FIG. 6 shows an exemplary block diagram of the overall architecture of a 3GPP LTE network that utilizes any of the techniques disclosed herein to determine whether a downlink signal comprises a new carrier type (NCT) downlink signal or a legacy downlink signal according to the subject matter disclosed herein.

FIG. 6 shows an exemplary block diagram of the overall architecture of a 3GPP LTE network 600 that utilizes any of the techniques disclosed herein to determine whether a downlink signal comprises a new carrier type (NCT) downlink signal or a legacy downlink signal according to the subject matter disclosed herein. FIG. 6 also generally shows exemplary network elements and exemplary standardized interfaces. At a high level, network 600 comprises a core network (CN) 601 (also referred to as an evolved Packet System (EPC)), and an air-interface access network E-UTRAN 602. CN 601 is responsible for the overall control of the various User Equipment (UE) connected to the network and establishment of the bearers. CN 601 may include functional entities, such as a home agent HA and/or an ANDSF server or entity, although not explicitly depicted. E-UTRAN 602 is responsible for all radio-related functions.

The main exemplary logical nodes of CN 601 include, but are not limited to, a Serving GPRS Support Node 603, the Mobility Management Entity 604, a Home Subscriber Server (HSS) 605, a Serving Gate (SGW) 606, a PDN Gateway 607 and a Policy and Charging Rules Function (PCRF) Manager 608. The functionality of each of the network elements of CN 601 is well known and is not described herein. Each of the network elements of CN 601 are interconnected by well-known exemplary standardized interfaces, some of which are indicated in FIG. 6, such as interfaces S3, S4, S5, etc., although not described herein.

While CN 601 includes many logical nodes, the E-UTRAN access network 602 is formed by one node, the evolved NodeB (base station (BS), eNB or eNodeB) 610, which connects to one or more User Equipment (UE) 611, of which only one is depicted in FIG. 6. UE 611 is also referred to herein as a wireless device (WD) and/or a subscriber station (SS), and can include an M2M-type device. In one exemplary configuration, a single cell of an E-UTRAN access network 602 provides one substantially localized geographical transmission point (having multiple antenna devices) that provides access to one or more UEs. In another exemplary configuration, a single cell of an E-UTRAN access network 602 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 604 by an S1-MME interface and to SGW 606 by an S1-U interface. The protocols that run between the eNBs and the UEs are generally referred to as the "AS protocols." Details of the various interfaces are well known and not described herein.

The eNB 610 hosts the PHYsical (PHY), Medium Access Control (MAC), Radio Link Control (RLC), and Packet Data Control Protocol (PDCP) layers, which are not shown in FIG. 6, and which include the functionality of user-plane header-compression and encryption. The eNB 610 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 610 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 611, generates pages for UEs 611 over the air, broadcasts system information, controls UE measurement reporting, such as the periodicity of Channel Quality Information (CQI) reports, and allocates cell-level temporary identifiers to active UEs 611. The RRC layer also executes transfer of UE context from a source eNB to a target eNB during handover, and provides integrity protection for RRC messages. Additionally, the RRC layer is responsible for the setting up and maintenance of radio bearers.

Figure 7:
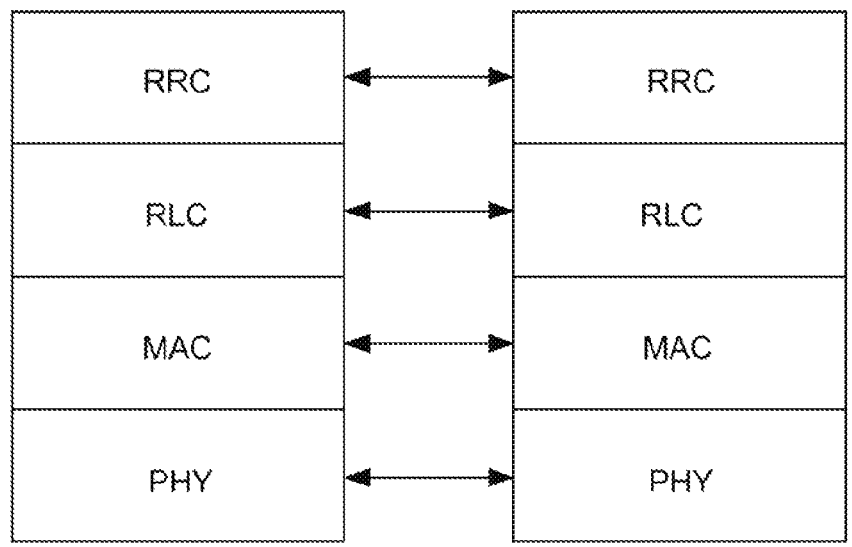
FIG. 7 depicts an exemplary radio protocol control plane for a radio interface protocol structure between a UE and an eNodeB that is based on a 3GPP-type radio access is network standard and that utilize any of the techniques disclosed herein to determine whether a downlink signal comprises a new carrier type (NCT) downlink signal or a legacy downlink signal according to the subject matter disclosed herein.
Figure 8:
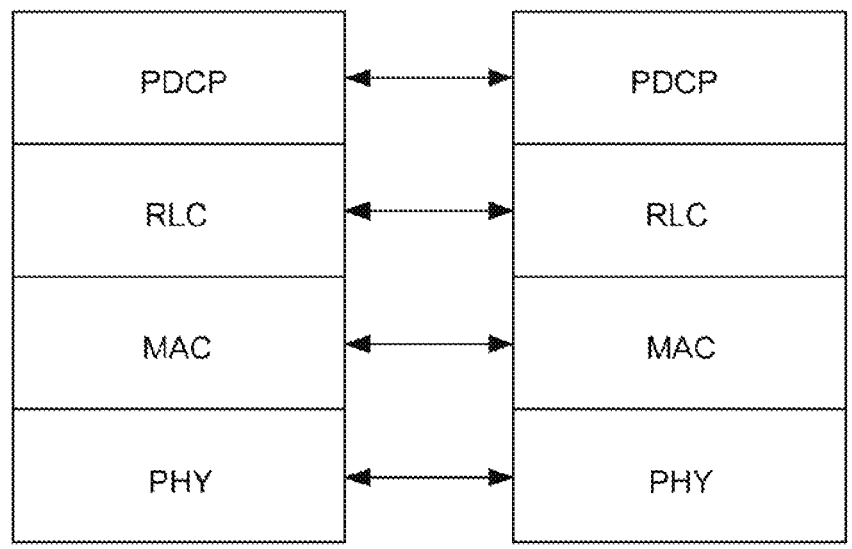
FIG. 8 depicts individual layers of a radio protocol user plane for an exemplary radio interface protocol structure between a UE and an eNodeB that is based on a 3GPP-type radio access network standard and that utilize any of the techniques disclosed herein to determine whether a downlink signal comprises a new carrier type (NCT) downlink signal or a legacy downlink signal according to the subject matter disclosed herein.

FIGS. 7 and 8 respectively depict exemplary radio interface protocol structures between a UE and an eNodeB that are based on a 3GPP-type radio access network standard and that utilize any of the techniques disclosed herein to determine whether a downlink signal comprises a new carrier type (NCT) downlink signal or a legacy downlink signal according to the subject matter disclosed herein. More specifically, FIG. 7 depicts individual layers of a radio protocol control plane and FIG. 8 depicts individual layers of a radio protocol user plane. The protocol layers of FIGS. 7 and 8 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the IUE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HIARQ) ACK or NACK Scheduling Request (SR) and Channel Quality Indicator (CQI) report information, received from first and second layers (L1 and L2).

Figure 9:
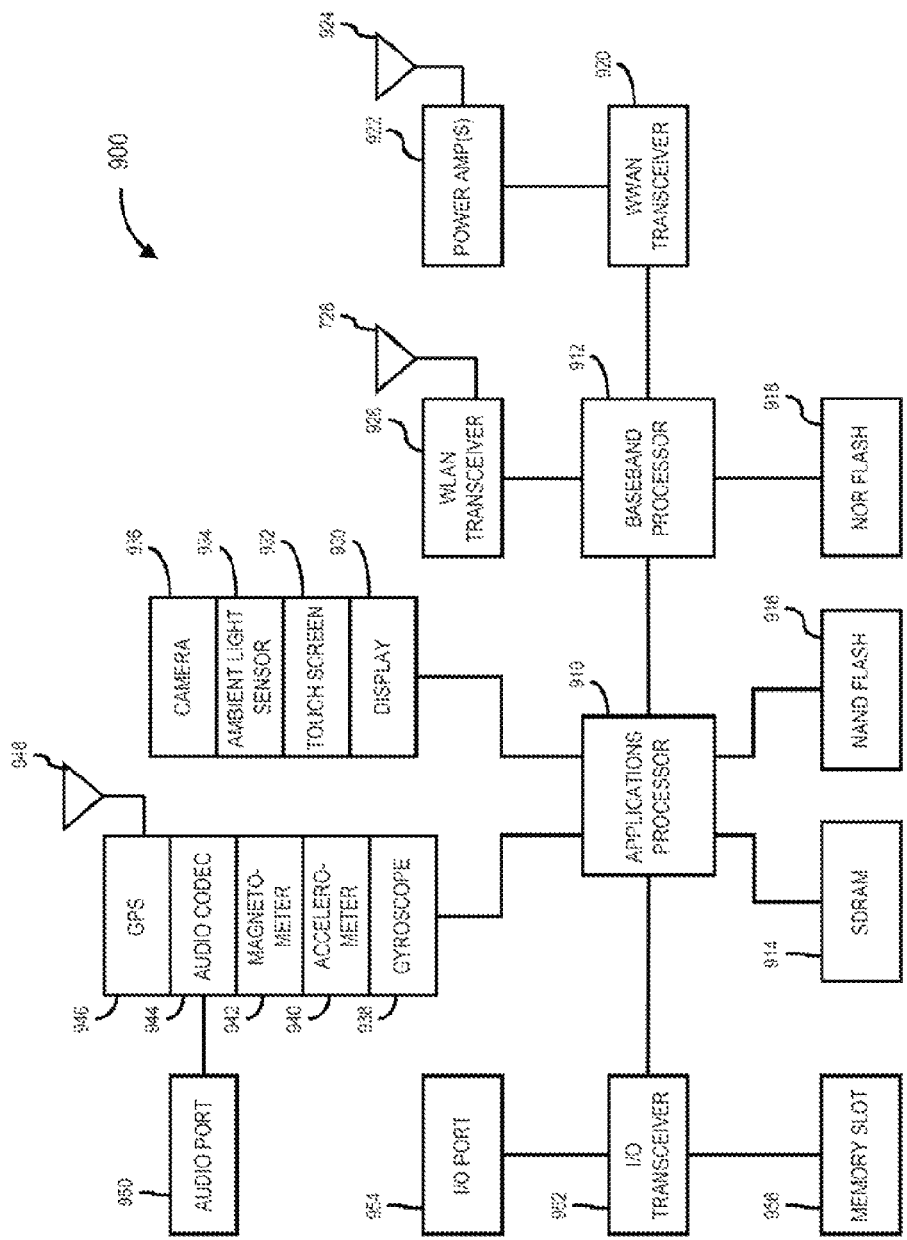
FIG. 9 depicts an exemplary functional block diagram of an information-handling system that utilizes any of the techniques disclosed herein to determine whether a downlink signal comprises a new carrier type (NCT) downlink signal or a legacy downlink signal according to the subject matter disclosed herein

FIG. 9 depicts an exemplary functional block diagram of an information-handling system 900 that utilizes any of the techniques disclosed herein to determine whether a downlink signal comprises a new carrier type (NCT) downlink signal or a legacy downlink signal according to the subject matter disclosed herein. Information-handling system 900 of FIG. 9 may tangibly embody one or more of any of the exemplary network elements and/or functional entities of the network as shown in and described with respect to FIG. 9. Although information-handling system 900 represents one example of several types of computing platforms, such as, but not limited to, eNB 610, and for a terminal device, such as a mobile station (MS), or User Equipment (UE) 611, information-handling system 900 may include more or fewer elements and/or different arrangements of elements than shown in FIG. 9, and the scope of the claimed subject matter is not limited in these respects.

In one or more embodiments, information-handling system 900 may comprise one or more applications processor 910 and a baseband processor 912. Applications processor 910 may be utilized as a general purpose processor to run applications and the various subsystems for information-handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on-board memory, such as cache memory, and further may be coupled to external memory devices such as synchronous dynamic random access memory (SDRAM) 914 for storing and/or executing applications during operation, and NAND flash 916 for storing applications and/or data even when information-handling system 900 is powered off. Baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example, for communicating via a 3GPP LTE network or the like as discussed herein with respect to FIG. 6. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and that may be capable of communicating via a Bluetooth-based standard, an IEEE 802.1-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 910 may drive a display 930 for displaying various information or data, and may further receive touch input from a user via a touch screen 932 for example via a finger or a stylus. An ambient light sensor 934 may be utilized to detect an amount of ambient light in which information-handling system 900 is operating, for example, to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information-handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example, via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

Figure 10:
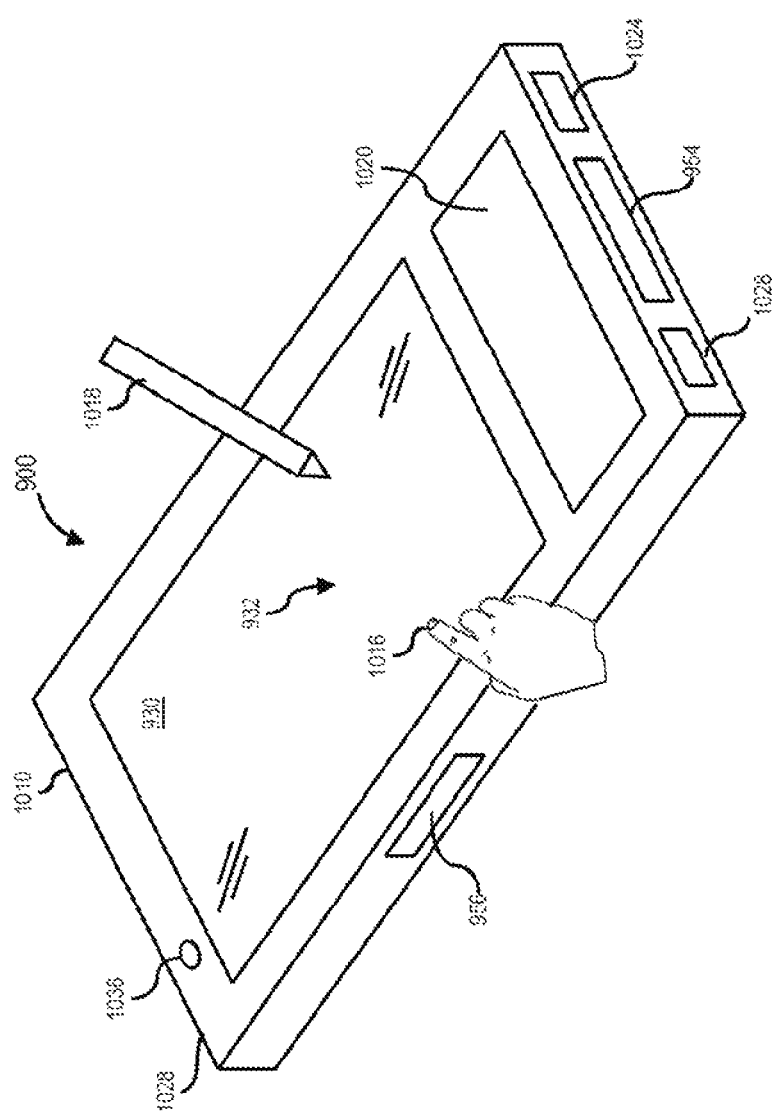
FIG. 10 depicts an isometric view of an exemplary embodiment of the information-handling system of FIG. 9 that optionally may include a touch screen in accordance with one or more embodiments.

FIG. 10 depicts an isometric view of an exemplary embodiment of the information-handling system of FIG. 9 that optionally may include a touch screen in accordance with one or more embodiments. For example, FIG. 10 shows an example implementation of information-handling system 800 of FIG. 9 tangibly embodied as a cellular telephone, smartphone, or tablet-type device or the like. In one or more embodiments, the information-handling system 900 may comprise a housing 1010 having a display 930 that may include a touch screen 932 for receiving tactile input control and commands via a finger 1016 of a user and/or a via stylus 1018 to control one or more applications processors 910. The housing 1010 may house one or more components of information-handling system 900, for example, one or more applications processors 910, one or more of SDRAM 914, NAND flash 916, NOR flash 918, baseband processor 912, and/or WWAN transceiver 920. The information-handling system 900 further may optionally include a physical actuator area 1020 that may comprise a keyboard 3, or buttons for controlling information-handling system via one or more buttons or switches. The information-handling system 900 may also include a memory port or slot 956 for receiving non-volatile memory, such as flash memory, for example, in the form of a secure digital (SD) card or a subscriber identity module (SIM) card. Optionally, the information-handling system 900 may further include one or more speakers and/or microphones 1024 and a connection port 954 for connecting the information-handling system 900 to another electronic device, dock, display, battery charger, and on. Additionally, information-handling system 900 may include a headphone or speaker jack 1028 and one or more cameras 1036 on one or more sides of the housing 1010. It should be noted that the information-handling system 900 of FIGS. 9 and 10 may include more or fewer elements than shown, in various arrangements, and the scope of the claimed subject matter is not limited in this respect.

Figure 11:
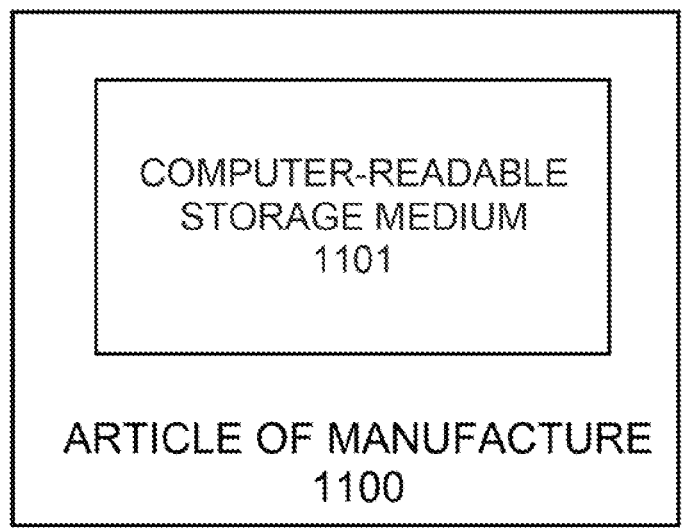
FIG. 11 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 11 depicts an exemplary embodiment of an article of manufacture 1100 comprising a non-transitory computer-readable storage medium 1101 having stored thereon computer-readable instructions that, when executed by a computer-type device, results in any of the various techniques and methods according to the subject matter disclosed herein. Exemplary computer-readable storage mediums that could be used for computer-readable storage medium 1101 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A method to define a downlink signal in a first carrier type, comprising:
   generating a first binary sequence for a first subframe of the downlink signal and a second binary sequence for a second subframe of the downlink signal, the first and second binary sequences being part of a Secondary Synchronization Signal (SSS) for the downlink signal, the downlink signal comprising a 3rd Generation Partnership Project (3GPP) Long Term Evolution (LTE) downlink signal so that a legacy device can avoid to attempt to connect to a new carrier type (NCT) downlink signal that is unavailable to the legacy device, and thereby conserve battery power;
   processing the first binary sequence with a first scrambling sequence; and
   processing the second binary sequence with a second scrambling sequence;
   the first and second scrambling sequences being distinguishable from a second carrier type,
   wherein the first and second scrambling sequences each comprise a cyclic-shifted version of an m-sequence.

2. The method according to claim 1, wherein the first carrier type comprises a new carrier type, and
   wherein the second carrier type comprises a legacy carrier type.

3. The method according to claim 1, wherein the first carrier type downlink signal is unavailable to a legacy User Equipment (UE).

4. The method according to claim 1, wherein the first and second scrambling sequences each comprise a pseudo random sequence, a Zadoff-Chu (ZC) sequence, a gold code, or an m-sequence or a combination thereof.

5. The method according to claim 1, wherein processing the first binary sequence with the first scrambling sequence produces a first scrambling result and wherein processing the second binary sequence with the second scrambling sequence produces a second scrambling result,
   the method further comprising:
   scrambling a first portion of the first scrambling result with a third scrambling sequence;
   scrambling a second portion of the first scrambling result with a fourth scrambling sequence;
   scrambling a first portion of the second scrambling result with the third scrambling sequence; and
   scrambling a second portion of the second scrambling result with the fourth scrambling sequence.

6. The method according to claim 1, wherein processing the first binary sequence with the first scrambling sequence produces a first scrambling result and wherein processing the second binary sequence with the second scrambling sequence produces a second scrambling result,
   the method further comprising:
   scrambling a first portion of the first scrambling result with a third scrambling sequence;
   scrambling a second portion of the first scrambling result with a fourth scrambling sequence;
   scrambling a first portion of the second scrambling result with the third scrambling sequence; and
   scrambling a second portion of the second scrambling result with the fourth scrambling sequence.

7. The method according to claim 1, wherein processing the first binary sequence with the first scrambling sequence produces a first scrambling result and wherein processing the second binary sequence with the second scrambling sequence produces a second scrambling result,
   the method further comprising:
   scrambling a first portion of the first scrambling result with a third scrambling sequence;
   scrambling a second portion of the first scrambling result with a fourth scrambling sequence;
   scrambling a first portion of the second scrambling result with the third scrambling sequence; and
   scrambling a second portion of the second scrambling result with the fourth scrambling sequence.

8. The method according to claim 1, wherein an order of the first and second scrambling sequences indicates that the downlink signal is a new carrier type downlink signal.

9. The method according to claim 1, wherein if a first segment of the Secondary Synchronization Signal (SSS) for the downlink signal is scrambled, then the downlink signal is not a new carrier type downlink signal, and wherein if a second segment of the SSS for the downlink signal is scrambled, then the downlink signal is a new carrier type downlink signal.

10. The method according to claim 1, wherein the method is performed by an evolved Node B (eNB).

11. An information-handling system, comprising: a receiver capable of receiving a downlink signal; and a processor coupled to the receiver, the processor being configured to determine whether the received downlink signal is a first carrier type downlink signal or a second carrier type by unscrambling a Secondary Synchronization Signal (SSS) of the downlink signal using first and second scrambling sequences, the first and second scrambling sequences being selected to indicate that the downlink signal comprises the first carrier type downlink signal, and the first carrier type downlink signal being unavailable to a legacy User Equipment (UE) of a 3rd Generation Partnership Project (3GPP) Long Term Evolution (LTE) communication system so that a legacy device can avoid to attempt to connect to a new carrier type (NCT) downlink signal that is unavailable to the legacy device, and thereby conserve battery power,
   wherein the first and second scrambling sequences each comprise a cyclic-shifted version of an m-sequence.

12. The information-handling system according to claim 11, wherein the first carrier type comprises a new carrier type, and
   wherein the second carrier type is a legacy carrier type.

13. The information-handling system according to claim 11, wherein the first and second scrambling sequences each comprise a pseudo random sequence, a Zadoff-Chu (ZC) sequence, a gold code, or an m-sequence or a combination thereof.

14. The information-handling system according to claim 11, wherein an order of the first and second scrambling sequences indicates that the downlink signal is a first carrier type downlink signal.

15. The information-handling system according to claim 11, wherein if a first segment of the Secondary Synchronization Signal (SSS) for the downlink signal is scrambled, then the downlink signal is not a first carrier type downlink signal, and wherein if a second segment of the SSS for the downlink signal is scrambled, then the downlink signal is a first carrier type downlink signal.

16. The information-handling system according to claim 11, wherein the information-handling system comprises a cellular telephone, smartphone, smart-type device, or tablet-type device.

17. The information-handling system according to claim 16, wherein the cellular telephone, smartphone, smart-type device, or tablet-type device further comprises a touchscreen display capable of receiving input information from a touch of a user or a stylus.

18. A non-transitory computer-readable medium having instructions stored thereon that, if executed, result in at least the following:
 generating a first binary sequence for a first subframe of a downlink signal and a second binary sequence for a second subframe of the downlink signal, the first and second binary sequences being part of a Secondary Synchronization Signal (SSS) for the downlink signal and being based on a physical-layer identification of a cell transmitting the downlink signal, the downlink signal comprising a 3rd Generation Partnership Project (3GPP) Long Term Evolution (LTE) downlink signal so that a legacy device can avoid to attempt to connect to a new carrier type (NCT) downlink signal that is unavailable to the legacy device, and thereby conserve battery power;
 processing the first binary sequence with a first scrambling sequence;
 processing the second binary sequence with a second scrambling sequence; and
 the first and second scrambling sequences indicating that the downlink signal is a new carrier type downlink signal, and a new carrier type downlink signal being unavailable to a legacy User Equipment (UE),
 wherein the first and second scrambling sequences each comprise a cyclic-shifted version of an m-sequence.

19. The non-transitory computer-readable medium according to claim 18, wherein processing the first binary sequence with the first scrambling sequence produces a first scrambling result and wherein processing the second binary sequence with the second scrambling sequence produces a second scrambling result,
 wherein the instructions, if executed, further result in:
 scrambling a first portion of the first scrambling result with a third scrambling sequence;
 scrambling a second portion of the first scrambling result with a fourth scrambling sequence;
 scrambling a first portion of the second scrambling result with the third scrambling sequence; and
 scrambling a second portion of the second scrambling result with the fourth scrambling sequence.

* * * * *